No. 705,185. Patented July 22, 1902.
A. H. WORREST.
HUB ATTACHING DEVICE.
(Application filed Jan. 7, 1901.)
(No Model.) 2 Sheets—Sheet 2.

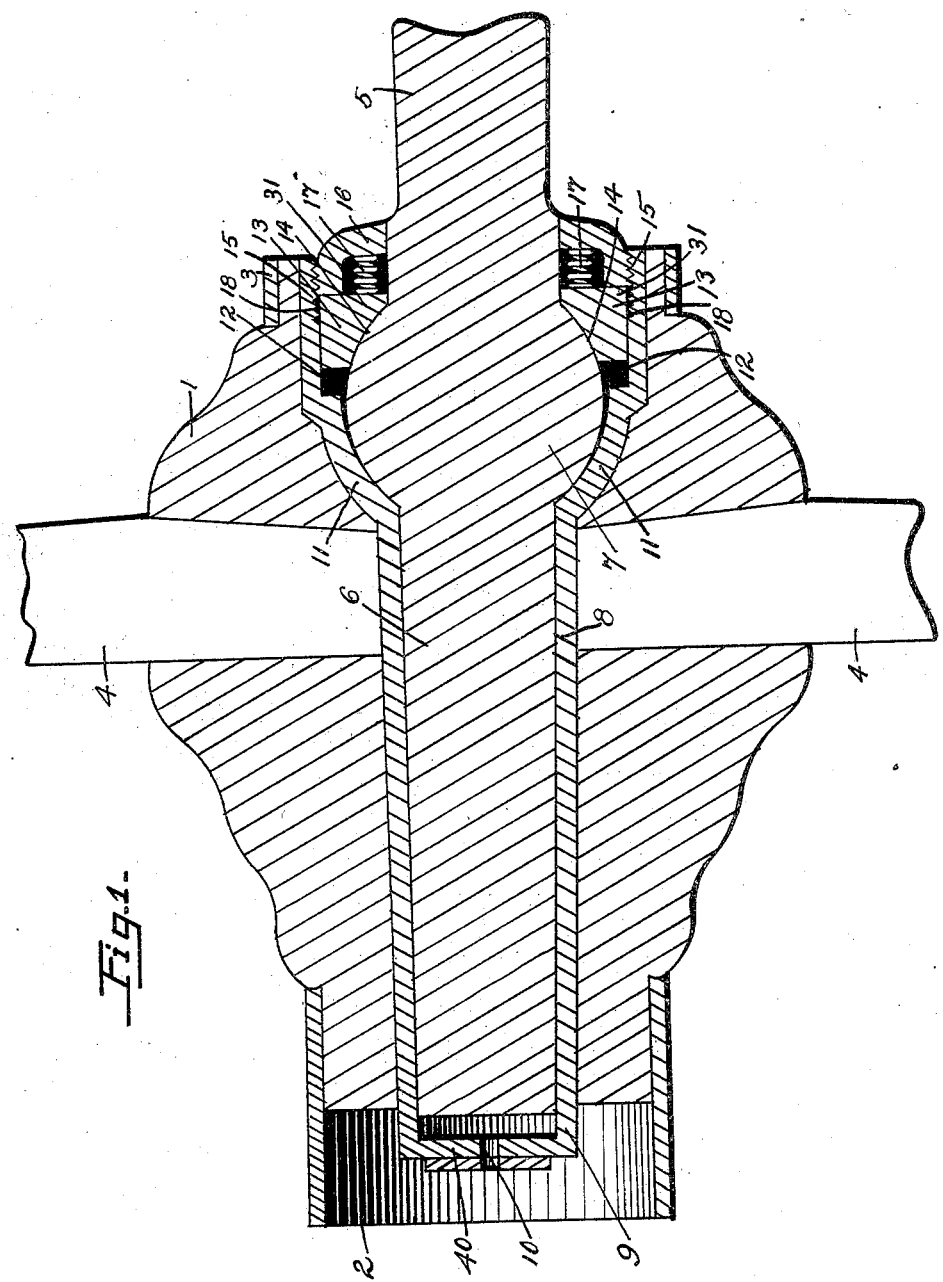

WITNESSES:
Chas. G. Hensel.
C. G. Bassler.

INVENTOR
Alferd H. Worrest
BY
Wm. R. Gerhart,
ATTORNEY.

UNITED STATES PATENT OFFICE.

ALFRED H. WORREST, OF LANCASTER, PENNSYLVANIA.

HUB-ATTACHING DEVICE.

SPECIFICATION forming part of Letters Patent No. 705,185, dated July 22, 1902.

Application filed January 7, 1901. Serial No. 42,304. (No model.)

*To all whom it may concern:*

Be it known that I, ALFRED H. WORREST, a citizen of the United States, and a resident of Lancaster, in the county of Lancaster and State of Pennsylvania, have invented certain Improvements in Hub-Attaching Devices, of which the following is a specification.

This invention relates to improvements in that class of constructions whereby the hub of a wheel is secured to the spindle of the axle; and the objects of these improvements are, first, to oil or grease the spindle without removing the wheel therefrom, and, second, to prevent the wheel from accidentally becoming detached from the spindle.

The invention consists in the construction, arrangement, and combination of parts, as hereinafter fully described and then pointed out in the claims.

Figure 6:
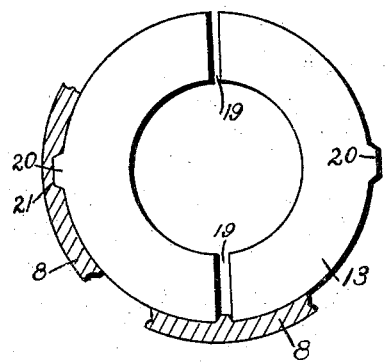
Figure 2:
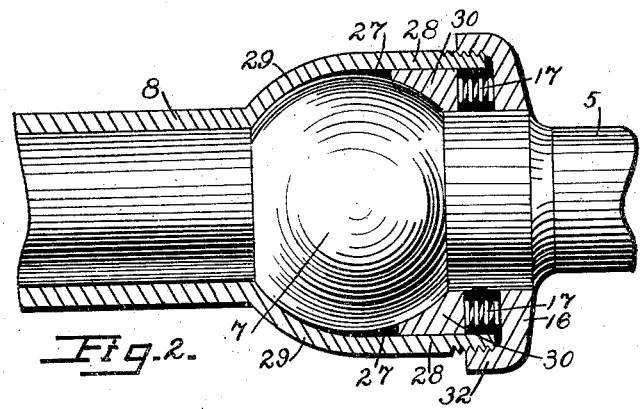
Figure 3:
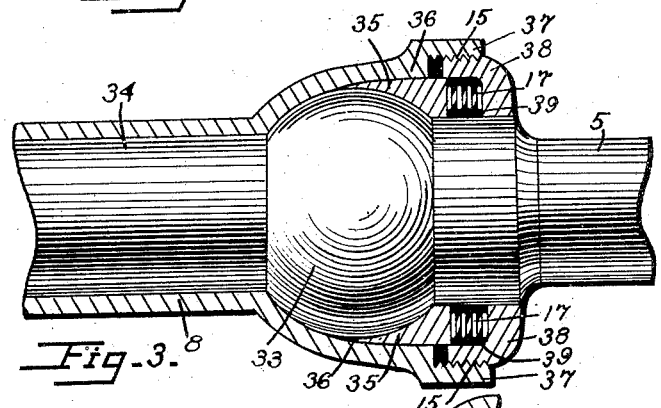
Figure 4:
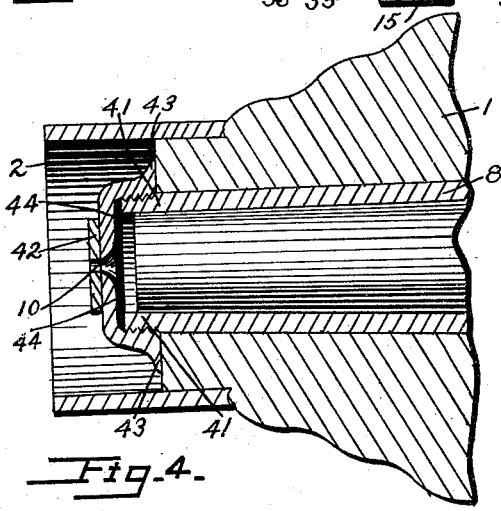
Figure 5:
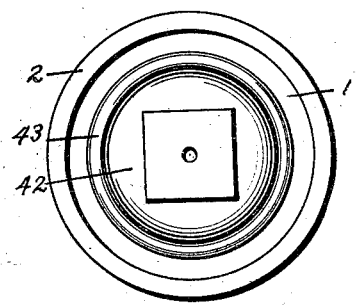

In the accompanying drawings, which form a part of this specification, Figure 1 is a side view of a spindle of an axle and a longitudinal sectional view of a hub and an axle-box embodying my improvements. Figs. 2 and 3 are longitudinal sections of modified constructions of the inner end of the axle-box; Fig. 4, a similar section of a modified construction of the outer end of the axle-box, and Fig. 5 an outer end view of a wheel-hub provided with an axle-box of said modified construction. Fig. 6 is a face view of the bearing-ring, and Fig. 7 a face view of the ring-nut.

Similar numerals indicate like parts throughout the several views.

Referring to the details of the drawings, 1 indicates the hub of a wheel; 2, the point-band; 3, the butt-band; 4, the spokes, and 5 the axle.

In Fig. 1, 6 refers to the spindle of the axle, having near its inner end a spherical boss 7. 8 indicates the axle-box, the outer extremity 9 whereof extends beyond the outer face of the hub and has in the center of the end thereof an orifice 10, and near its inner end the axle-box is expanded, as shown at 11, forming a hemispherical socket wherein is engaged the inner hemisphere of boss 7, and in the inner end of the axle-box and adjacent to hemispherical socket 11 is an annular chamber 12, into which protrudes the outer hemisphere of boss 7. A bearing-ring 13, of metal or any other suitable material and located in chamber 12, embraces the butt of the spindle and has in its inner face a curved socket 14, that engages and forms a bearing for the outer hemisphere of boss 7. The outer end of the wall of chamber 12 is threaded, as seen at 15, and through this threaded portion a ring-nut 16 is engaged with the axle-box. The inner face of ring-nut 16 is hollowed out, and located therein and extending entirely around spindle 6 is a series of coiled springs 17, each of which has one end bearing against the bottom of the cavity in the ring-nut and the other end bearing against the back of bearing-ring 13, thus forming a resilient cushion between the ring-nut and the bearing-ring. These springs may be entirely separate the one from the other, or they may be connected as are the springs of beds. The pressure of springs 17 on bearing-ring 13 holds the latter in close contact with boss 7 and compels it to take up the wear of the parts. The screw-thread 15 in the inner end of the axle-box is extended inward far enough, as shown at 18, to permit the tension of springs 17 to be increased. Any elastic body suitable for the purpose may be substituted for the springs.

In Fig. 6 is a face view of bearing-ring 13 in place in chamber 12 of the axle-box. (Shown in section.) As seen in this figure, bearing-ring 13 is divided into two sections at 19, and on the periphery of each section is a transverse rib 20, that engages corresponding grooves 21 in the inner wall of chamber 12, whereby said bearing-ring is revolved with the axle-box. Instead of two, bearing-ring 13 can be divided into as many more sections as may be deemed expedient.

Figure 7:
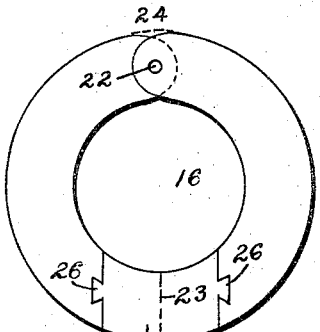

In Fig. 7 is shown a face view of ring-nut 16. This nut may be divided in various ways—into two sections hinged together at 22, as shown by full lines, and meeting, as shown by broken line 23, or the lines of the nut may be continuous at the top, as indicated by broken lines 24, and a section 25 be cut out below of sufficient width to allow the said nut to take over the axle, section 25 being connected with the body of the ring-nut by dovetail joints 26, or it may be divided in any other way suitable for the purpose, as the manner of dividing the ring-nut does not form any part of this invention.

In Fig. 2 is illustrated a modification in the inner end of the axle-box, wherein the chamber 27 thereof is formed by walls 28, tangent to the walls 29 of the socket of said box. With this construction the thickness of bearing-ring 30 need not be so great as that of the bearing-ring shown in Fig. 1, for the peripheral portion 31 of bearing-ring 13 is not needed to enable bearing-ring 30 to fill the chamber 27. In this device the ring-nut embraces the end of the axle-box, as shown at 32.

In Fig. 3 is illustrated a further modification in the arrangement of the inner end of the axle-box, wherein the curves of the boss 33 longitudinally of its spindle 34 are elliptical instead of being arcs of circles, as are those shown in Figs. 1 and 2. The bearing-ring 35 is of similar construction to that shown in Fig. 2, and the chamber 36, wherein it is placed, is formed as is the chamber 27; but the portion 37 of the axle-box forming the socket for the ring-nut 38 is enlarged, so that when said nut is in place the hollow seat 39 for the springs 17 is of the same diameter as that of chamber 36.

In Fig. 1 the part 40, closing the outer end of the axle-box, is integral therewith. In Fig. 4, however, the outer end 41 is closed by a screw-cap 42, having a rim 43 on its inner end, whereby outward movement of the hub on the axle-box is prevented.

The back of the ring-nut forms a wall 44, that prevents the escape of any of the lubricant in the chamber of the axle-box lying below the central opening in said ring-nut.

In these constructions the opening through which the lubricant is fed to the axle is placed in the center of the end of the axle-box, whereby as the wheel revolves there is always an outer wall preventing the escape of said lubricant. The boss on the spindle and the socket in the axle-box engaged thereby form a ball-and-socket joint, providing the easiest possible shoulder-bearing against the outward thrust of the spindle, while the bearing-ring, the ring-nut, and the springs between them hold the boss snugly to its seat, take up the wear, and prevent looseness and rattling of the parts. The advantage of the concave shape of the sockets and of the convex shape of the bosses is that they enable the bosses under the pressure exerted thereon to take up the wear of the contacting parts both vertically and horizontally.

I do not restrict myself to the details of the construction herein shown and described, as it is obvious that many alterations might be made therein without departing from the principle and scope of my invention.

Having thus described my invention, what I claim as new, and desire to secure by Letters Patent, is—

1. In combination, an axle-box provided with a forwardly-extending concave socket having a rear opening, a spindle, a forwardly-extending convex boss on the spindle and adapted to enter said rear opening and engage the socket, and means for maintaining the boss in engagement with the socket, for the purpose specified.

2. In combination, an axle-box provided with a forwardly-extending concave socket having a rear opening as great as its own diameter, a spindle, a forwardly-extending convex boss on the spindle and adapted to engage said socket, and means for maintaining the boss in engagement with the socket, for the purpose specified.

3. In combination, an axle-box provided with a forwardly-extending concave socket having a rear opening as great as its own diameter, the walls of said socket forming elliptical curves, a spindle, an elliptically-shaped forwardly-extending convex boss on the spindle and adapted to engage said socket, and means for maintaining the boss in engagement with the socket, for the purpose specified.

4. In combination, an axle-box provided with a forwardly-extending concave socket having a rear opening as great as its own diameter, a spindle, a forwardly-extending convex boss on the spindle and adapted to engage said socket, a bearing-ring in the axle-box and engaging the rear of the boss, and means for maintaining the pressure of said ring against the boss, for the purpose specified.

5. In combination, an axle-box provided with a forwardly-extending concave socket having a rear opening as great as its own diameter, a spindle, a forwardly-extending convex boss on the spindle and adapted to engage said socket, a bearing-ring in the axle-box and engaging the rear of the boss, and a ring-nut on the axle-box, wherethrough the bearing-ring is pressed up to the boss, for the purpose specified.

6. In combination, an axle-box provided with a forwardly-extending concave socket having a rear opening as great as its own diameter, a spindle, a forwardly-extending convex boss on the spindle and adapted to engage said socket, a bearing-ring in the axle-box and engaging the rear of the boss, a ring-nut screwed to the axle-box, and a resilient cushion between the ring-nut and the bearing-ring, for the purpose specified.

7. In combination, an axle-box provided with a forwardly-extending concave socket having a rear opening as great as its own diameter, a spindle, a forwardly-extending convex boss on the spindle and adapted to engage said socket, a bearing-ring in the axle-box and engaging the rear of the boss, a ring-nut screwed to the axle-box, and a series of springs between the ring-nut and the bearing-ring, for the purpose specified.

8. In combination, an axle-box provided with a forwardly-extending concave socket having a rear opening as great as its own diameter, a spindle, a forwardly-extending convex boss on the spindle and adapted to engage said socket, a bearing-ring having a socket engaging the rear of the boss, a ring-nut screwed to the axle-box, and a resilient cushion between the ring-nut and the bearing-ring, for the purpose specified.

9. In combination, an axle-box provided with a forwardly-extending concave socket having a rear opening as great as its own diameter, the walls of said socket forming elliptical curves, a spindle, an elliptically-shaped forwardly-extending convex boss on the spindle and adapted to engage said socket, a bearing-ring in a chamber behind the socket and engaging the rear of the boss, a ring-nut screwed to the axle-box, and a resilient cushion between the ring-nut and the bearing-ring, for the purpose specified.

ALFRED H. WORREST.

Witnesses:
C. G. BASSLER,
WM. R. GERHART.